United States Patent
Ito et al.

(10) Patent No.: US 6,876,600 B2
(45) Date of Patent: Apr. 5, 2005

(54) PORTABLE TERMINAL APPARATUS HAVING AUTOMATIC ADJUSTMENT FUNCTION FOR TIME DIFFERENCE

(75) Inventors: Takeshi Ito, Yokohama (JP); Natsuki Ushigome, Yokohama (JP); Satoru Matsumoto, Fujisawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/148,475

(22) PCT Filed: May 23, 2001

(86) PCT No.: PCT/JP01/04328
§ 371 (c)(1),
(2), (4) Date: May 30, 2002

(87) PCT Pub. No.: WO01/90826
PCT Pub. Date: Nov. 29, 2001

(65) Prior Publication Data
US 2002/0181333 A1 Dec. 5, 2002

(30) Foreign Application Priority Data
May 26, 2000 (JP) ........................................ 2000-156665

(51) Int. Cl.[7] .............................................. G04B 19/22
(52) U.S. Cl. .......................................... 368/21; 368/47
(58) Field of Search .............................. 368/21–22, 47, 368/51, 69–76

(56) References Cited

U.S. PATENT DOCUMENTS 4,204,398 A  * 5/1980  Lemelson ..................... 368/47
4,274,151 A  * 6/1981  Kamiwaki .................... 368/21
4,681,460 A  * 7/1987  Nishimura .................... 368/21
5,008,866 A  * 4/1991  Thinesen ...................... 368/21
5,455,807 A  * 10/1995 Nepple et al. ................ 368/47
6,282,431 B1 * 8/2001  Konno ......................... 455/425
6,393,263 B1 * 5/2002  Hayashi ....................... 455/145
6,393,463 B1 * 5/2002  Fuchigami ................... 709/206

FOREIGN PATENT DOCUMENTS

EP         0 565 927 A1    10/1993
FR         2 748 760 A     4/2000

* cited by examiner

*Primary Examiner*—Kamand Cuneo
*Assistant Examiner*—Thanh S. Phan
(74) *Attorney, Agent, or Firm*—Pearne & Gordon LLP

(57) ABSTRACT

Area location information on a base station received by a receiver (12) is identified by an area location identification section (14) and an identification result is output to a time controller (24). In case an area location of a portable terminal apparatus (10) has changed with the movement of the portable terminal apparatus (10) thus causing a time difference in the area location of the portable terminal apparatus (10) before and after the movement, the time controller (24) obtains time difference information from a time difference information database (34), adds/subtracts the obtained time difference information to/from a reference time of a timekeeping section (18) to automatically calculate the time corresponding to the area location of the portable terminal apparatus (10) after movement and displays the time on the display section (26). Thus it is possible to display the correct time without entering or registering time difference information by a user.

23 Claims, 10 Drawing Sheets

FIG. 2
| LOCATION CODE | TIME DIFFERENCE INFORMATION AREA [ TIME ] | AREA |
|---|---|---|
| ... | ... | ... |
| n-1 | -2 | AREA Y |
| n | -1 | AREA Z |
| 0 | 0 | AREA OF THE GREENWICH MEAN TIME |
| 1 | 1 | AREA A |
| 2 | 2 | AREA B |
| 3 | 3 | AREA C |
| ... | ... | ... |
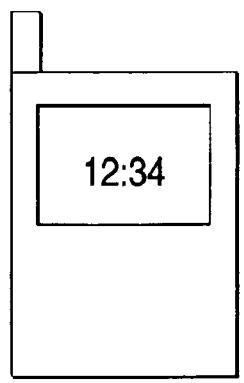
FIG. 3A
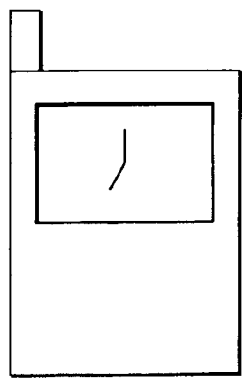
FIG. 3B
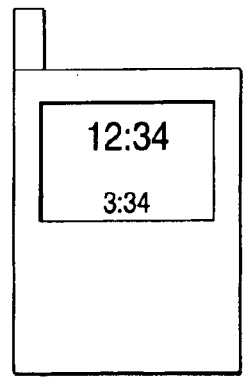
FIG. 3C
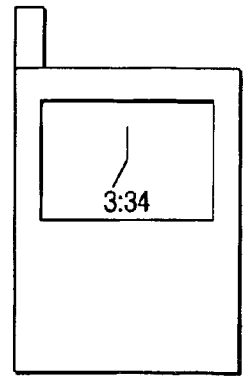
FIG. 3D

PORTABLE TERMINAL APPARATUS HAVING AUTOMATIC ADJUSTMENT FUNCTION FOR TIME DIFFERENCE

This application claims the benefit of International Application Number PCT/JP01-04328, which was published in English on Nov. 29, 2001.

TECHNICAL FIELD

The present invention relates to portable terminal apparatus that can keep and display time correctly even when the user has moved from a first area to a second area that has a time difference from the first area.

BACKGROUND ART

The time display system for related art portable terminal apparatus displays only the time in a specific area preset to the portable terminal apparatus. In case the portable terminal apparatus capable of international roaming has moved to an area to which communications are supported, the user has to set the time of his/her portable terminal apparatus in order to correctly display the time in the destination area each time a time difference is generated by the movement.

For example, the Japanese Patent Publication No. H4-119020 describes car telephone apparatus that receives an identification code representing the location of a base station and corrects time to be displayed based on the time difference registered in correspondence with the identification code in case the identification code has changed.

Further, the described car telephone apparatus issues an alarm when the car telephone apparatus has moved to an area where no identification codes are registered and registers a time difference by the user's input of a time difference corresponding to the destination area from the operation section, then corrects the displayed time based on the registered time difference.

However, in the time correction method via related art car telephone apparatus, etc., the user has to enter a time difference corresponding to the destination area when the user moves to an area where no identification codes are registered, that is, no time difference information is registered, even in case the area does not have a time difference, thus causing cumbersome time difference input work.

In case the user does not know the correct time difference information concerning the destination area when he/she has moved to an area where a time difference is not registered, the user cannot correct time properly.

In case the user wishes to know the time in a specific area except the area where the user is currently located, the user has to obtain the time via calculation based on the time difference between the area the user is currently located and the specific area.

The invention has been proposed in view of such a situation and aims at providing portable terminal apparatus that properly corrects time and displays the corrected time.

DISCLOSURE OF INVENTION

First portable terminal apparatus for attaining the aforementioned object is portable terminal apparatus comprising a feature for keeping and displaying time, characterized in that the portable terminal apparatus comprises a receiver for receiving the area location information indicating the location of the portable terminal apparatus, an area identification section for identifying the area information of the portable terminal apparatus based on the output from the receiver, a time difference information database for storing information on a time difference from the Greenwich Mean Time by a plurality of area locations, a reference area table for storing the reference area location information as the area location information serving as a reference location of the portable terminal apparatus, a timekeeping section for keeping and displaying the reference time that is the time in the reference area, a time controller for obtaining the time difference information on the area location after movement from the reference area location from the time difference information database, adding/subtracting the obtained time difference information to/from the reference time of the timekeeping section, and automatically calculating the time corresponding to the area location after movement in case the area location of the portable terminal apparatus has changed with the movement of the portable terminal apparatus from the identification result of the area location by the reference area location identification section, thus causing a time difference between the area locations before and after movement, and a display section for displaying the time automatically calculated by the time controller.

According to the portable terminal apparatus, it is possible to receive the area location information on the portable terminal apparatus even in case the portable terminal apparatus has moved to another area, automatically calculate the time corresponding to the area of the portable terminal apparatus by obtaining the time difference information on the received area location, and display the calculated time on the display section.

The correct time display is made without the user entering or registering time difference.

Second portable terminal apparatus is characterized in that the display section displays either the reference time or the time corresponding to the area location after movement, or a combination of these times.

According to the portable terminal apparatus, it is possible to display the reference time or the time corresponding to the area location after movement, or these times.

Third portable terminal apparatus is characterized in that the portable terminal apparatus has an area specification section that can specify one or more arbitrary area locations, that the time controller obtains information on the time difference of the specified area location from the reference from the time difference information database and adds/subtracts the obtained time difference information to/from the reference time of the timekeeping section in case the arbitrary area location is specified in the area specification section, and that the display section displays at least the time corresponding to the specified area location.

According to the portable terminal apparatus, it is possible to calculates the time corresponding to the specified area location from the time difference in the time difference information database and display the time on the display section.

Fourth portable terminal apparatus is characterized in that the display section displays either the reference time, the time corresponding to the area location after movement or the time corresponding to the specified area location, or a combination of these times.

According to the portable terminal apparatus, it is possible to display either the reference time or the time corresponding to the area location after movement, or a combination of these times.

Fifth portable terminal apparatus has a mode input section for selectively entering the time difference calculation mode on whether to automatically calculate the time corresponding to the area location after movement or not to the time controller and a mode setting table for storing the time difference calculation mode entered via the mode setting section, characterized in that the time controller calculates the time corresponding to the area location after movement and the display section displays the time corresponding to the area location after movement in case the time difference calculation mode is a mode where the time corresponding to the area location after movement is automatically calculated, and that the time controller calculates the time corresponding to the specified area location and the display section displays the time corresponding to the specified area location in case the time difference calculation mode is a mode where the time corresponding to the area location after movement is not calculated.

According to the portable terminal apparatus, the time difference calculation mode can be used to select whether to automatically calculate and display the time corresponding to the area location after movement. In a mode where the time corresponding to the area location after movement is not automatically calculated, it is possible to calculate and display the time corresponding to the area location after movement.

Sixth portable terminal apparatus has a time difference information input section for entering information on time difference from the reference area by the plurality of area locations and a manual time difference information table for storing information on time difference from the reference area entered via the time difference information input section by the plurality of area locations, characterized in that the arbitrary area location is specified via the area specification section, that the time controller obtains information on the time difference of the specified location from the reference area location from the manual time difference information table and adds/subtracts the obtained time difference information to/from the reference time of the timekeeping section to calculate the time corresponding to the specified area location, and that the display section displays at least the time corresponding to the specified area location.

According to the portable terminal apparatus, it is possible to calculates the time corresponding to the specified area location from the manual time difference information table and display the time on the display section. It is possible to enter the time difference information stored in the manual time difference information table via the time difference information input section.

Seventh portable terminal apparatus is characterized in that the portable terminal apparatus comprises an alarm section for announcing coincidence of a single time with a preset alarm set time in case the single time is displayed on the display section.

According to the portable terminal apparatus, when the alarm set time coincides with a single time displayed on the display section, an alarm is issued via the alarm section.

Eighth portable terminal apparatus has a time specification section for specifying an arbitrary time from among a plurality of times in case the plurality of times are displayed on the display section, characterized in that the portable terminal apparatus comprises an alarm section for announcing coincidence of a time specified by the time specification section with a preset alarm set time.

According to the portable terminal apparatus, in case a plurality of times are displayed on the display section, an alarm is issued via the alarm section when the alarm set time coincides with a time specified by the time specification section.

Ninth portable terminal apparatus is characterized in that the portable terminal apparatus comprises a time controller for turning off the power to a preset unit in the portable terminal apparatus when a single time coincides with a preset power set time in case the single time is displayed on the display section.

According to the portable terminal apparatus, it is possible to turn off the power to a unit preset by the time controller when a preset power set time coincides with a single time displayed on the display section.

Tenth portable terminal apparatus comprises a time specification section for specifying an arbitrary time from among a plurality of times in case the plurality of times are displayed on the display section, characterized in that the portable terminal apparatus comprises a time controller for turning off the power to a preset unit in the portable terminal apparatus when a time specified by the time specification section coincides with a preset power set time.

According to the portable terminal apparatus, it is possible to turn off the power to a unit preset by the time specification section when a preset power set time coincides with a time specified by the time specification section.

Eleventh portable terminal apparatus comprises an alarm time setting section for setting an alarm set time as a time to issue an alarm for a single time in case the single time is displayed on the display section and a timekeeping section for turning on or off the power to a preset unit in the portable terminal apparatus, characterized in that the timekeeping section sets and maintains the power-off alarm set time obtained by adding/subtracting the time difference of the reference time from the single time to/from the alarm set time, that the timekeeping section turns on the power to a preset unit in the portable terminal apparatus in case the reference time coincides with the power-off alarm set time in the timekeeping section while the power to a preset unit in the portable terminal apparatus is turned off, that the time controller calculates information on the time difference of the area location assumed when power is turned on this time from the area location just before the power is turned off from the time difference information database, and that the timekeeping section adds/subtracts the calculated time difference information to/from the alarm set time and resets and maintains the power-off alarm set time and further turns off the power to a preset unit in the portable terminal apparatus.

According to the portable terminal apparatus, the power to a preset unit in the portable terminal apparatus is turned on in case the reference time coincides with the power-off alarm set time in the timekeeping section while the power to a preset unit is turned off.

The timekeeping section obtains information on the area location after movement from the area location before movement from the time difference information database, adds/subtracts the obtained time difference information to/from the alarm set time to reset the alarm set time, and adds/subtracts the time difference of the reference time from the reset alarm set time to/from the alarm set time, sets and maintains the power-off alarm set time and further turns off a preset unit in the portable terminal apparatus. This allows resetting of the alarm set time based on the obtained time difference information.

Twelfth portable terminal apparatus comprises a time specification section for specifying an arbitrary time from among a plurality of times in case the plurality of times are displayed on the display section, an alarm time setting section for setting an alarm set time as a time to issue an alarm for a time specified by the time specification section and a timekeeping section for turning on or off the power to a preset unit in the portable terminal apparatus, characterized in that the timekeeping section sets and maintains the power-off alarm set time obtained by adding/subtracting the time difference of the reference time from the time specified by the time specification section to/from the alarm set time, that the timekeeping section turns on the power to a preset unit in the portable terminal apparatus in case the reference time coincides with the power-off alarm set time in the timekeeping section while the power to a preset unit in the portable terminal apparatus is turned off, that the time controller calculates information on the time difference of the area location assumed when power is turned on this time from the area location just before the power is turned off from the time difference information database, and that the timekeeping section adds/subtracts the calculated time difference information to/from the power-off alarm set time and resets and maintains the power-off alarm set time and further turns off the power to a preset unit in the portable terminal apparatus.

The portable terminal apparatus comprises an alarm section for announcing coincidence of a time specified by the time specification section with a preset alarm set time. The power to a preset unit in the portable terminal apparatus is turned on in case the reference time coincides with the power-off alarm set time while the power to a preset unit is turned off.

The timekeeping section obtains information on the area location after movement from the area location before movement from the time difference information database, adds/subtracts the obtained time difference information to/from the alarm set time to reset the alarm set time, and adds/subtracts the time difference of the reference time from the reset alarm set time to/from the alarm set time, sets and maintains the power-off alarm set time and further turns off a preset unit in the portable terminal apparatus. This allows resetting of the alarm set time based on the obtained time difference information.

Thirteenth portable terminal apparatus comprises a power-on time setting section for setting the power set time to turn on the power to a preset unit in the portable terminal apparatus for a single time in case the single time is displayed on the display section and a timekeeping section for turning on or off the power to a preset unit in the portable terminal apparatus, characterized in that the timekeeping section sets and maintains the power-off alarm set time obtained by adding/subtracting the time difference of the reference time from the single time to/from the alarm set time, that the timekeeping section turns on the power to a preset unit in the portable terminal apparatus in case the reference time coincides with the power-off alarm set time in the timekeeping section while the power to a preset unit in the portable terminal apparatus is turned off, that the time controller calculates information on the time difference of the area location assumed when power is turned on this time from the area location just before the power is turned off from the time difference information database, and that the timekeeping section adds/subtracts the calculated time difference information to/from the power-off power set time and resets and maintains the power-off power set time and further turns off the power to a preset unit in the portable terminal apparatus.

According to the portable terminal apparatus, the power to a preset unit in the portable terminal apparatus is turned on in case the reference time coincides with the power-off power set time in the timekeeping section while the power to a preset unit is turned off.

The timekeeping section obtains information on the time difference of the area locations assumed when power is turned on this time from the area location just before the power is turned off from the time difference information database, adds/subtracts the obtained time difference information to/from the power set time to reset the power set time, and adds/subtracts the time difference of the reference time from the reset power set time to/from the power set time, sets and maintains the power-off power set time and further turns off a preset unit in the portable terminal apparatus. This allows resetting of the power set time based on the obtained time difference information.

Fourteenth portable terminal apparatus comprises a time specification section for specifying an arbitrary time from among a plurality of times in case the plurality of times are displayed on the display section, a power-on time setting section for setting the power set time to turn on the power to a preset unit in the portable terminal apparatus for a time specified by the time specification section and a timekeeping section for turning on or off the power to a preset unit in the portable terminal apparatus, characterized in that the timekeeping section sets and maintains the power-off power set time obtained by adding/subtracting the time difference of the reference time from the time specified by the time specification section to/from the power set time, that the timekeeping section turns on the power to a preset unit in the portable terminal apparatus in case the reference time coincides with the power-off power set time in the timekeeping section while the power to a preset unit in the portable terminal apparatus is turned off, that the time controller calculates information on the time difference of the area location assumed when power is turned on this time from the area location just before the power is turned off from the time difference information database, and that the timekeeping section adds/subtracts the calculated time difference information to/from the power set time and resets and maintains the power-off power set time and further turns off the power to a preset unit in the portable terminal apparatus.

According to the portable terminal apparatus, the power to a preset unit in the portable terminal apparatus is turned on in case the reference time coincides with the power-off power set time in the timekeeping section while the power to a preset unit is turned off.

The timekeeping section obtains information on the time difference of the area location assumed when power is turned on this time from the area location just before the power is turned off from the time difference information database, adds/subtracts the obtained time difference information to/from the power set time to reset the power set time, and adds/subtracts the time difference of the reference time from the reset power set time to/from the power set time, sets and maintains the power-off power set time and further turns off a preset unit in the portable terminal apparatus. This allows resetting of the power set time based on the obtained time difference information.

Fifteenth portable terminal apparatus is characterized in that the preset unit in the portable terminal apparatus at least does not include a timekeeping section.

According to the portable terminal apparatus, power is fed to at lease the timekeeping section even when the power is turned on so that it is possible to keep the basic time.

Sixteenth portable terminal apparatus comprises a reference area receiver for receiving the reference area location information stored in the reference area table, characterized in that the time controller updates the reference area location information in the reference area table based on the reference area location information received by the reference area receiver.

According to the portable terminal apparatus, it is possible to update the reference area location information in the reference area table based on the reference area location information received by the reference area receiver.

Seventeenth portable terminal apparatus is characterized in that the portable terminal apparatus comprises a reference area specification section for specifying the area location of the reference area stored in the reference area table to an arbitrary area location.

According to the portable terminal apparatus, it is possible to arbitrarily set the reference area location information in the reference area table based on the reference area location information specified by the reference area specification section.

Eighteenth portable terminal apparatus comprises a time difference information receiver for receiving the time difference information stored in the time difference information database, characterized in that the time controller updates the reference area location information in the time difference information database based on the time difference information received by the time difference information receiver.

According to the portable terminal apparatus, it is possible to change the time difference information in the time difference information database to the received time difference information based on the time difference information received by the time difference information receiver to update the time difference information.

Nineteenth portable terminal apparatus comprises a base station information receiver for receiving area location information and time concerning a base station sent from the station, characterized in that the time controller compares the time of the base station received by the base station information receiver with the calculated base station time as a time calculated in correspondence with the area location information on the base station, obtains the time difference of the calculated base station time from the base station time in case the both times do not coincide with each other, and adds/subtracts the time difference information to/from the time difference information in the time difference information database so that the calculated base station time may coincide with the base station time, thereby updating the time difference information.

According to the portable terminal apparatus, by receiving area location information and time concerning a base station via a base station information receiver, the time controller compares the time of the base station received by the base station information receiver with the calculated base station time as a time calculated in correspondence with the area location information on the base station, obtains the time difference of the calculated base station time from the base station time in case the both times do not coincide with each other, and adds/subtracts the time difference information to/from the time difference information in the time difference information database so that the calculated base station time may coincide with the base station time, thereby updating the time difference information. It is thus possible to update the time difference information in the time difference information database by receiving area location information and time concerning a base station.

Twentieth portable terminal apparatus comprises a fine adjustment table for storing minute information in a rewritable way, characterized in that the time controller adjusts the time based on the fine adjustment information to calculate the time.

According to the portable terminal apparatus, the time controller can perform fine adjustment of time based on the fine adjustment table.

Twenty-first portable terminal apparatus comprises a summer time adjustment table for storing summer time information in a rewritable way, characterized in that the time controller adjusts the time based on the summer time information to calculate the time.

According to the portable terminal apparatus, the time controller can make adjustment to set the time to the summer time based on the summer time adjustment table.

Twenty-second portable terminal apparatus is characterized in that the time controller adjusts day, month, and/or year in case day, month, and/or year is changed in the time on the display section before displaying the time on the display section.

According to the portable terminal apparatus, the time controller adjusts day, month, and/or year in case day, month, and/or year is changed in the time on the display section, thus correctly displaying the day, month, and/or year of the time display.

BRIEF DESCRIPTION OF THE DRAWINGS

FIG. 2 shows the configuration of a time difference information database;

FIGS. 3A–D show each display mode on the display section;

BEST MODE FOR CARRYING OUT THE INVENTION

Figure 1:
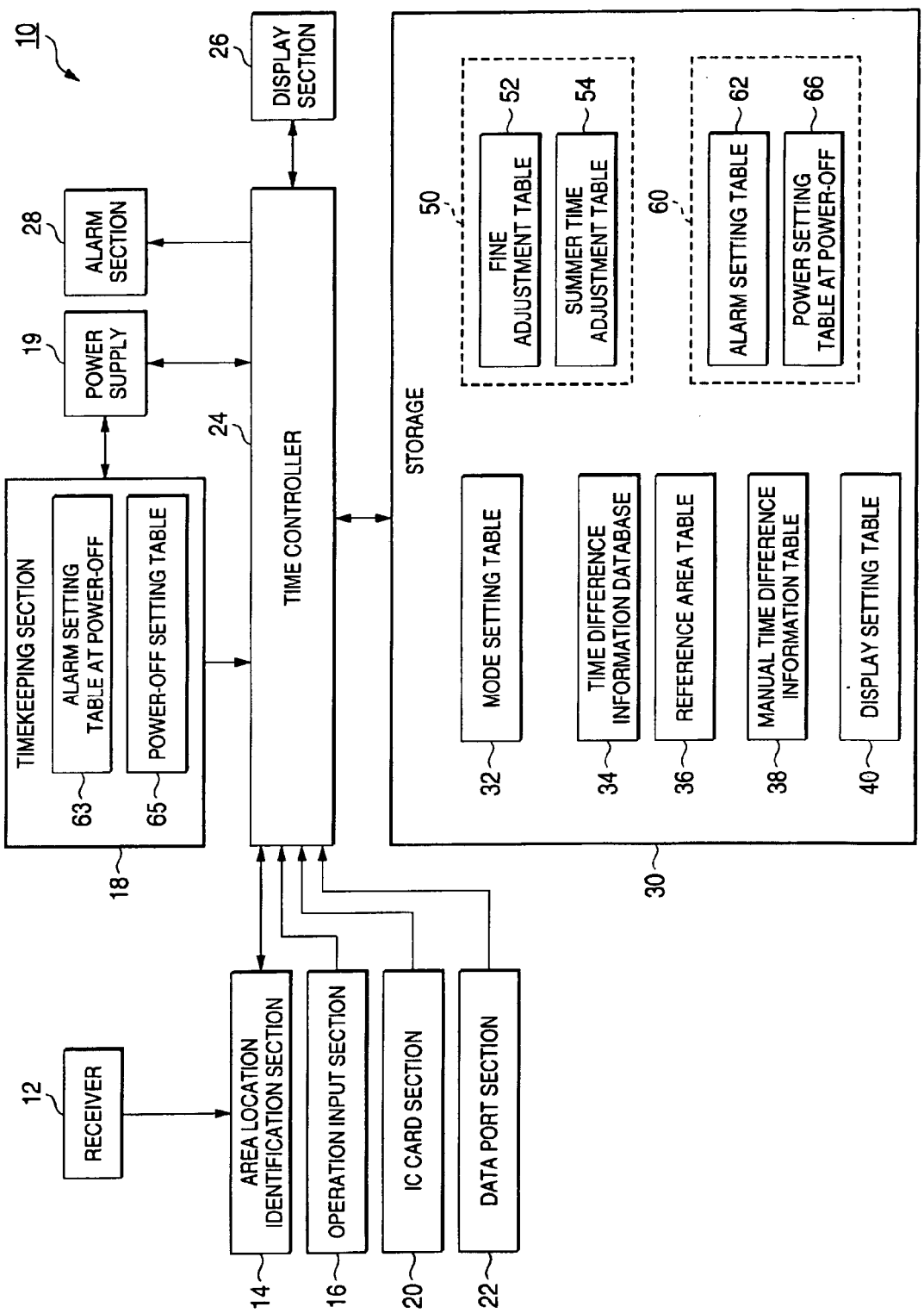
FIG. 1 is a block diagram showing the configuration of portable terminal apparatus according to the invention.

Configuration of portable terminal apparatus according to an embodiment of the invention will be described referring to drawings. FIG. 1 is a block diagram showing the configuration of portable terminal apparatus according to the invention.

Outline of the configuration of the internal unit of the portable terminal apparatus 10 will be described referring to FIG. 1.

The portable terminal apparatus 10 is composed of a receiver 12 for receiving location information of the area location of the portable terminal apparatus 10, an area location identification section 14 for identifying the area location of the portable terminal apparatus 10 based on the area location information received by the receiver 12, an operation input section 16 for setting the time difference calculation mode of the portable terminal apparatus 10 or entering a variety of data, a timekeeping section 18 for keeping the reference time as a reference time for the portable terminal apparatus 10, a power supply section 19 for feeding power to each unit, an IC card section 20 for performing transmission/reception of information to/from information recording media except the portable terminal apparatus 10 (not shown) such as an IC card, a data port section 22 for performing transmission/reception of information to/from equipment except the portable terminal apparatus (not shown), a time controller 24 for calculating time, a display section 26 for displaying the time calculated by the time controller 24, an alarm section 28 for issuing an alarm when the alarm set time is reached, and a storage 30 for storing various information.

The storage 30 comprises a mode setting table 32 for storing the time calculation mode in the portable terminal apparatus 10, a time difference information database 34 for storing information on a time difference from the Greenwich Mean Time by a plurality of area locations, a reference area table 36 for storing the reference area location information as the area location information serving as a reference location of the portable terminal apparatus 10, a manual time difference information table 38 for storing information on time difference by area location arbitrarily set by the user, a display setting table 40 for storing the display mode as a display format for displaying the time on the display section 26, a time adjustment table 50 for storing adjustment data for adjusting the time via the time controller 24, and an alarm/power control table 60 for storing the time to send an alarm to the user from the portable terminal apparatus 10 and the time to control power-off to a preset unit in the portable terminal apparatus 10.

Further, the time adjustment table 50 includes a fine adjustment table 52 for storing fine adjustment information used to perform fine adjustment of time via the time controller 24 and a summer time adjustment table 54 for storing summer time information used to adjust the time to the time corresponding to the summer time via the time controller 24.

Further, the alarm/power control table 60 includes an alarm setting table 62 for storing the alarm set time to send an alarm to the user and a power-off setting table 66 for storing the power set time to turn off power to a preset unit in the portable terminal apparatus 10.

The preset unit to be powered on or off at least does not include the timekeeping section 18. That is, power is always fed to at least the timekeeping section 18 from the power supply 19.

In this embodiment, the receiver 12 corresponds to a receiver, reference area receiver, time difference information receiver, or a base station information receiver. The IC card section 20 or data port section 22 corresponds to a reference area receiver or time difference information receiver.

The operation input section 16 corresponds to an area specification section, mode input section, time difference information input section, time specification section, reference area specification section, alarm time setting section, or power time setting section.

Each unit of the portable terminal apparatus 10 related to this embodiment will be detailed.

The receiver 12 receives information on an area location of a base station via radio communications for example from the base station, etc. It is possible to receive information for identifying the area location of which base station where the portable terminal apparatus 10 is present via the receiver 12.

Information on the area location received contains location information on a country or area where a time difference from the Greenwich Mean Time can be determined. As information on the area location, information for identifying the area location is available such as a nation code (mobile country code) used in a GSM (Global System for Mobile Communications) network for digital portable telephone sets and a country code specified in the ISO-1366.

Further, in case a country has a plurality of areas with time differences from the Greenwich Mean Time, for example in the U.S.A. or Australia, an area code is assigned to each area as information of the area location.

While the information on the area location received by the receiver 12 is information on the area location from a base station used in a potable telephone network in this embodiment, information for identifying the area location may be received from a satellite used in the GPS (Global Positioning System).

The area location identification section 14 obtains information on the area location received by the receiver 12 to identify the area location of the portable terminal and outputs the identification result to the time controller 24.

The operation input section 16 is a unit for setting the time difference calculation mode of the portable terminal apparatus 10 or making various setting and entering various data and includes for example a ten-key pad and various function keys used for input and setting. Output of the operation input section 16 is input to the time controller 24.

The timekeeping section 18 keeps the reference time of the portable terminal apparatus 10. The reference time is a time used as a reference in the portable terminal apparatus 10 and is constant irrespective of the information received by the receiver 12 or information input from other units. The timekeeping section 18 outputs the reference time to the time controller 24.

Power is always fed to the timekeeping section 18 from the power supply 19. Further, the timekeeping section 18 incorporates an alarm setting table at power-off 63 for setting and maintaining the alarm set time at power-off and a power setting table at power-off 65 for maintaining the power set time at power-off.

In the power setting table at power-off 65, the power set time at power-off as a power set time for power-on entered via the operation input section 16 is set and maintained. The power set time at power-off is maintained in the power setting table at power-off 63 because power is fed to the timekeeping section 18 even in case power to a preset unit is turned off.

Further, the power set time at power-off is a power set time for a reference time. For example, in case a power set time is set to a time for power-on (for example a time displayed on the display section) and there is a time difference between the power-on time and the reference time, the power set time at power-off is obtained based on the time difference.

As an example, in case the reference time 10:00 a.m. and the power-on time is 8:00 a.m. and the alarm set time 9:00 a.m., the time difference of the time for power-on from the reference time is −2 [hours], so that the power set time at power-off is 2 [hours] after 9:00 a.m., that is, 11:00 a.m. Thus, in case power to a preset unit is turned off, preparation for turning on the power to the preset unit starts when the reference time reaches the power set time at power-off.

The alarm setting table at power-off 63 will be explained in conjunction with the alarm setting table 62.

The power supply 19 feeds power to each unit in the portable terminal apparatus 10. The power supply 19 is controlled by the timekeeping section 18 and the time controller 24 thus allowing turning on/off the power feeding to a preset unit.

The IC card section 20 is a unit for reading information such as the area location information on the reference area and time difference information corresponding to each area location stored on the IC card (not shown) and outputting the information to the time controller 24.

The data port section 22 is a unit for receiving information such as the area location information on the reference area and time difference information from the Greenwich Mean Time corresponding to each area location and outputting the information to the time controller 24. For example, the data port section 22 can use a serial data port, parallel data port, or USB (Universal Serial Bus) data port, etc.

The time controller 24 controls each unit or receives output from each unit to calculate the time. Further, time difference calculation method differs in accordance with the time difference calculation mode set via the operation input section 16. Details will be explained later using description of the storage 30 and a flowchart. Here, a case using the automatic mode as a time difference calculation mode is outlined.

When the information on the area location received by the receiver 12 is identified by the area location identification section 14 and the identification result is input to the time controller 24, then the portable terminal apparatus 10 moves causing a change in the corresponding area location, the time difference of the area location after movement is obtained from the time difference information database 34 and the obtained time difference is added/subtracted to/from the reference time from the timekeeping section 18 to automatically calculate the time at the area location after movement.

The time controller 24 performs time adjustment on the calculated time based on the adjustment information stored in the time adjustment table 50.

The display section 26 displays the time calculated and adjusted by the time controller 24. The display mode used for displaying the time on the display section 26 is set via the operation input section 16 and the display section 16 is display-controlled by the time controller 24.

The storage 30 is composed of a table and a database, etc. for storing some information. The configuration of the storage 30 is explained below.

The mode setting table 32 stores the time calculation mode of the portable terminal apparatus 10 entered from the operation input section 16. The time calculation mode is either the automatic mode or manual mode.

The automatic mode obtains the time difference of the area location after movement from the reference area from the time difference information database 34 via the time controller 24, adds/subtracts the time difference after movement to/from the reference time to automatically calculate the time of the area location after movement, once the area location having a time difference from the area location before movement is identified by the area location identification section 14 when the portable terminal apparatus 10 has moved causing a change in the area location.

The manual mode is a mode where operation of the automatic mode is turned off (automatic mode is inoperative). In the manual mode, the time controller 24 does not add/subtract a time difference to the reference time even in case a time difference is caused before and after the movement of the portable terminal apparatus 10, but calculates the time corresponding to an arbitrary area location specified via the operation input section 16.

The time difference information database 34 stores time difference information from the Greenwich Mean Time by a plurality of area locations. The time difference information database 34 is in particular a database shown in FIG. 2.

FIG. 2 shows the configuration of a time difference information database.

As shown in FIG. 2, the time difference information database 34 sets corresponding time differences from the Greenwich Mean Time by area location. In FIG. 2, the area location is represented in a location code such as 1 through n etc., which may be any location code to identify a country or area, and of course may be a country code and an area code as mentioned earlier. Time difference of each area location uses the Greenwich Mean Time as a reference and represented in +T[hours] or −T[hours].

Time difference information in the time difference information database 34 is stored in a rewritable way to reflect reception by the receiver 12 or reception of time difference information via the IC card section 20 or data port section 22.

The reference area table 36 stores reference area location information that is information on the reference area location of the portable terminal apparatus 10. The reference area location information is in particular similar to location codes stored in the time difference information database 34 and the time difference from the Greenwich Mean Time is the same value. For example, assuming that the reference area location information is location code 1, the time difference from the Greenwich Mean Time is 1 hour.

The reference area location information is entered from the operation input section 16 or via the IC card section 20 or data port section 22, or received via the receiver 12 then stored in the reference area table 36 in a rewritable way.

Even in case the reference area information is modified, the reference time output from the timekeeping section 18 remains unchanged.

The manual time difference information table 38 stores time difference information by area location that the user can set arbitrarily. Time difference information by area location is input from the operation input section 16 and stored in the manual time difference information table 38 in a rewritable way. The manual time difference information table 38 has a similar configuration to that of the time difference information database 34 shown in FIG. 2 and stores time differences from the time of the reference area by area location.

The display setting table 40 stores the display mode as a display format used to display the time on the display section 26. The display mode is entered or set from the operation input section 16. The display mode is for example a digital display mode to display a time via numerals or an analog display mode to display a time using simulated long hand and short hand of an analog clock, or a multiple display mode to display a plurality of times at a time. An example of the display mode is shown in FIGS. 3A–D.

FIGS. 3A–D shows each display mode on the display section.

FIG. 3A shows a digital display mode, FIG. 3B an analog display mode, FIG. 3C a digital multiple display mode, and FIG. 3D a digital-analog multiple display mode.

FIG. 3A shows a case where the digital display mode is entered via the operation input section 16 to display a time in digital form. The time displayed here is the time calculated via the time controller 24 in case the automatic mode is selected in the mode setting table 32 and for example the time of an arbitrary area location specified via the operation input section 16 in case the manual mode is selected via the mode setting table 32. It is possible to display the basic time irrespective of the setting mode.

FIG. 3B shows a case where the analog display mode is entered via the operation input section 16 to display a time in analog form. The time displayed varies with the mode selected via the mode setting table 32, for example same as the case in FIG. 3A.

FIG. 3C shows a case where two times are displayed in digital form. In this display mode, one display time may be for example the time of the area location after a change in the automatic mode, the time of an arbitrary are location in the manual mode, or a reference time. The other display time can display time same as the one display area. Arbitrarily selected two types of times or any combination of times of two area locations can be displayed.

FIG. 3D shows a digital-analog mixture mode where two times to be displayed are specified on the operation input section 16. This display mode is similar to the display mode in FIG. 3C except that one of the times is displayed in analog form.

While two locations are specified for time display in FIGS. 3C and 3D on the operation input section 16, of course the number of locations may be three or more and time display concerning the area locations specified may be arbitrarily set to digital or analog display via the operation input section 16.

The time adjustment table 50 stores adjustment information to be referenced in adjusting the time via the time controller 24.

The fine adjustment table 52 stores fine adjustment information (time) for fine adjustment of time on the time controller 24. Further, the fine adjustment time is arbitrarily stored by the operation input section 16 so that it is possible to arbitrarily set the fine adjustment time for the time calculated by the time controller.

Thus, assuming that, for example, the automatic mode is selected in the mode setting table 32 and codes on the area location received by the receiver 12 are only country-based country codes and the portable terminal apparatus 10 has moved to a country having area locations across multiple time zones in the same country, a certain time can be added/subtracted to/from the time calculated by the time controller 24 to obtain the correct time by setting the fine adjustment time as required. In case the portable terminal apparatus 10 has moved to another country in the same mode, it is possible, via the time controller 24, to set the fine adjustment time in the fine adjustment table 52 to ±0 to clear it.

In case calculation of times of a plurality of area locations is specified via the operation input section 16, adjustment time for each of the plurality of times output from the time controller 24 may be stored in the fine adjustment table 52.

The summer time adjustment table 54 stores summer time information for adjusting the time to the time corresponding to the summer time via the time controller 24. The summer time information is information for setting the time to the summer time (on) or not (off). In particular, the summer time adjustment table 54 adjusts the time to advance it by one hour in case the calculated time is to be set to the summer time.

The summer time information (on or off) can be individually set to a plurality of area locations. It is thus possible to set the summer time to arbitrary area locations.

The alarm/power control table 60 stores alarm set time to issue an alarm to the user and the power set time to turn off power to a preset unit in the portable terminal apparatus 10.

The alarm setting table 62 stores the alarm set time to issue an alarm to the user via sound, light or vibration. Further, the alarm set time is entered via the operation input section 16 in a rewritable way. The time calculated and adjusted via the time controller 24 is compared with the alarm set time and in case these times match with each other, an alarm is issued by the alarm section 28.

Alarm set time can be individually set to the time of each area location. In case a plurality of area location are specified via the operation input section 16 and times of each area location are displayed, alarm setting is allowed to the time of each area location.

In case the alarm set time is set in the alarm setting table 62, the alarm set time at power-off is simultaneously set and maintained in the alarm setting table at power-off 63 of the timekeeping section 18. The alarm set time at power-off can be maintained in the alarm setting table at power-off 63 even in case power to a preset unit is turned off, because power is fed to the timekeeping section 18.

Further, the alarm set time at power-off is an alarm set time to the reference time. For example, in case the alarm set time is set to the time to issue an alarm (for example time displayed on the display section) and the time to issue an alarm has a time difference from the reference time, the alarm set time at power-off is obtained based on the time difference. To give an example, in case the reference time is 7:00 p.m., time to issue an alarm is 8:00 p.m., and alarm set time is 10:00 p.m., the time difference of the time to issue an alarm from the reference time is +1[hour] so that the alarm set time at power-off will be one hour before 10:00 p.m., that is, 9:00 p.m. Thus, in case power to a preset unit is turned off, preparation for issuing an alarm starts when the reference time reaches the alarm set time at power-off.

The setting table at power-off 66 stores the power set time as a time to turn off power to a preset unit in the portable terminal apparatus 10. The power set time is entered via the operation input section 16 in a rewritable way. The time calculated and adjusted via the time controller 24 is compared with the power set time and in case these times match with each other, the power supply 19 turns off power to a preset unit.

In case a plurality of area location are specified via the operation input section 16 and times of each area location are displayed, power set time can be set to the time of each area location.

This is the end of the description on configuration of the storage 30.

Next, operation of the portable terminal apparatus 10 will be explained using a flowchart.

Figure 4:
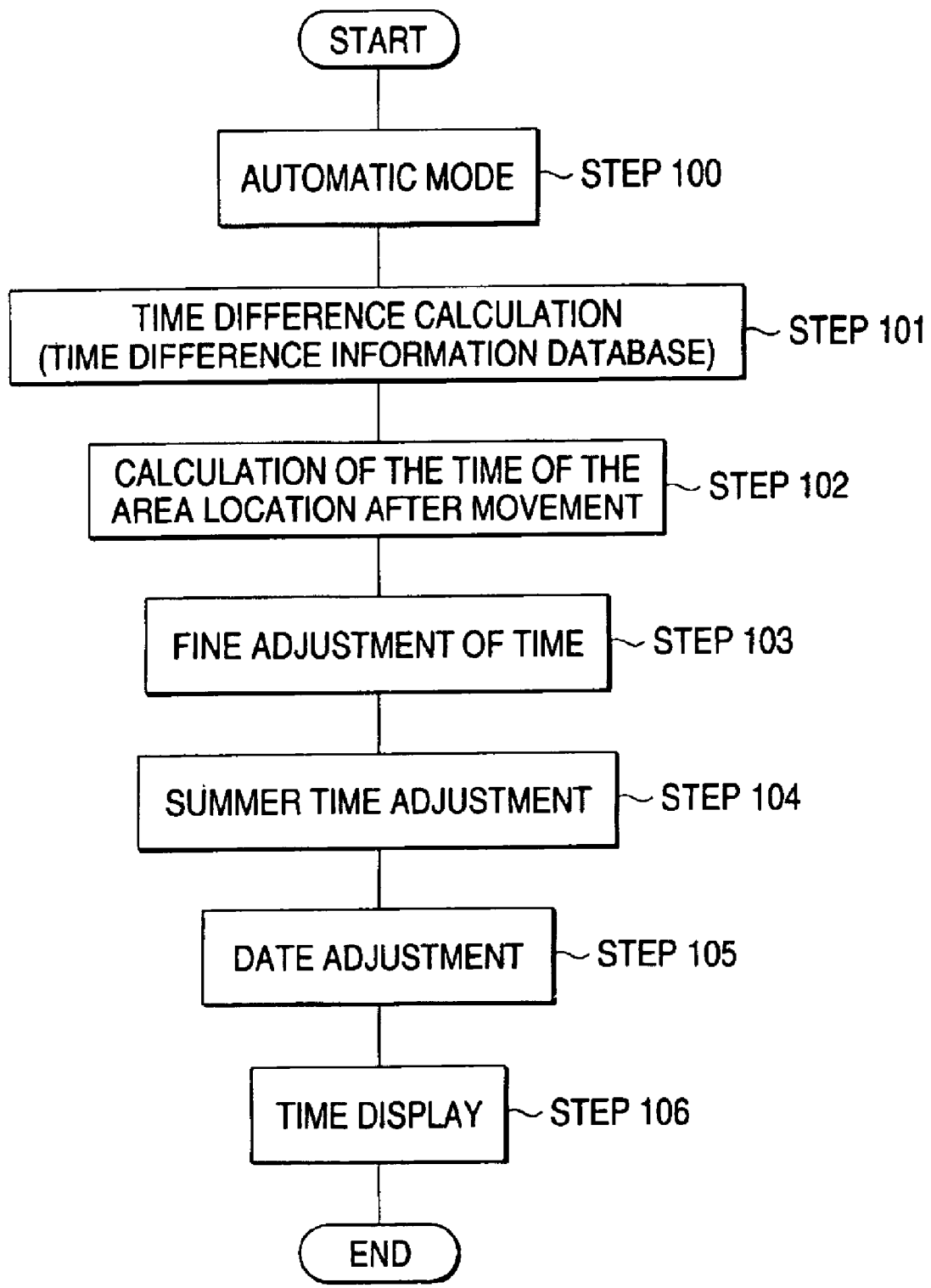
FIG. 4 is a flowchart showing the basic operation of time calculation in the controller.
Figure 5:
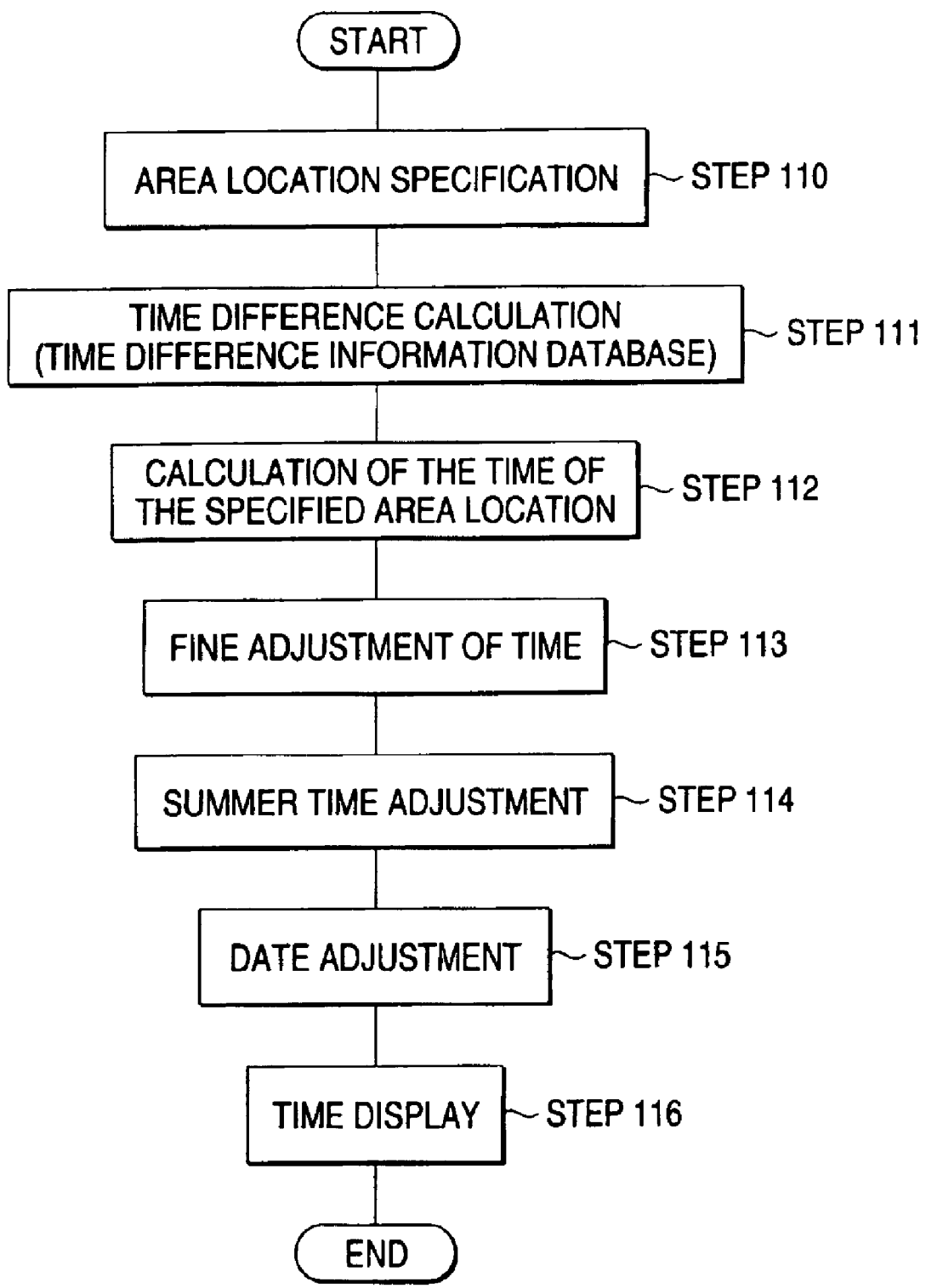
FIG. 5 is a flowchart showing the time calculation made in case the area location is specified.
Figure 6:
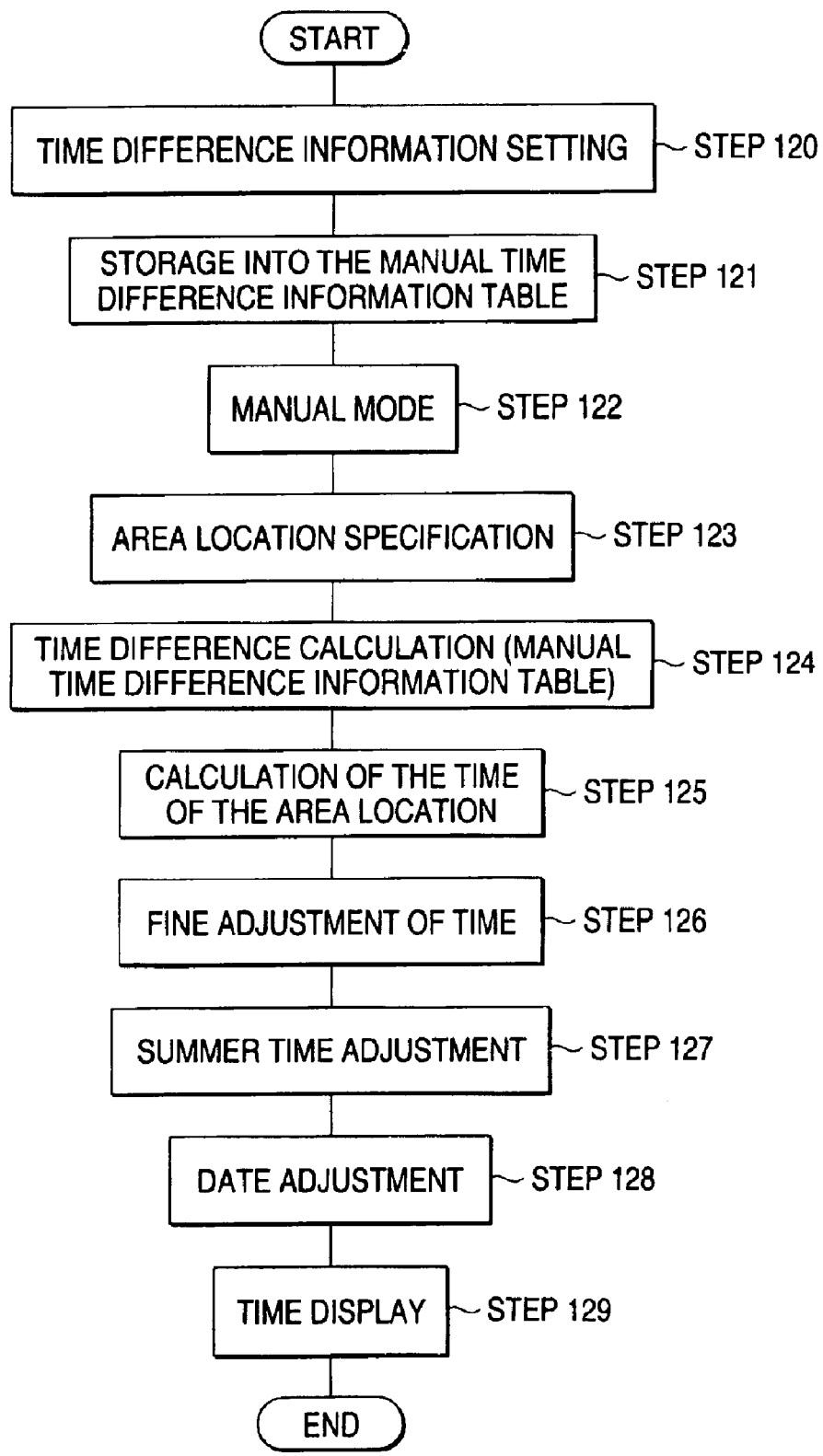
FIG. 6 is a flowchart showing storage of time difference information into the manual time difference information table and time calculation.
Figure 7:
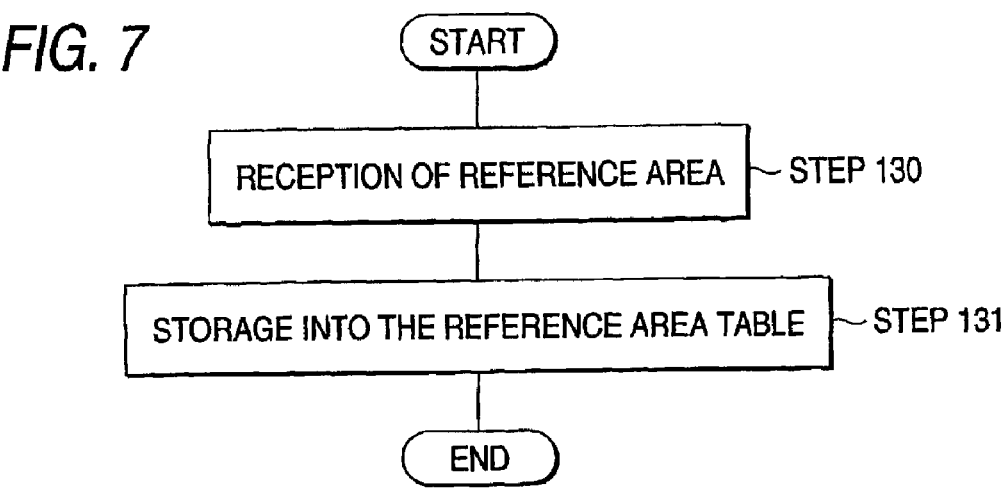
FIG. 7 is a flowchart showing storage of received reference area information into the reference area table.
Figure 8:
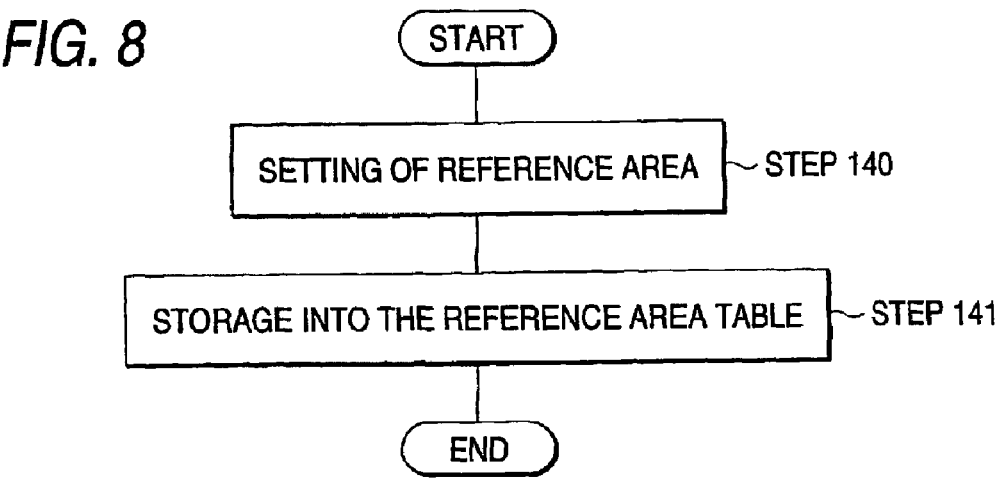
FIG. 8 is a flowchart showing storage of reference area information into the reference area table.
Figure 9:
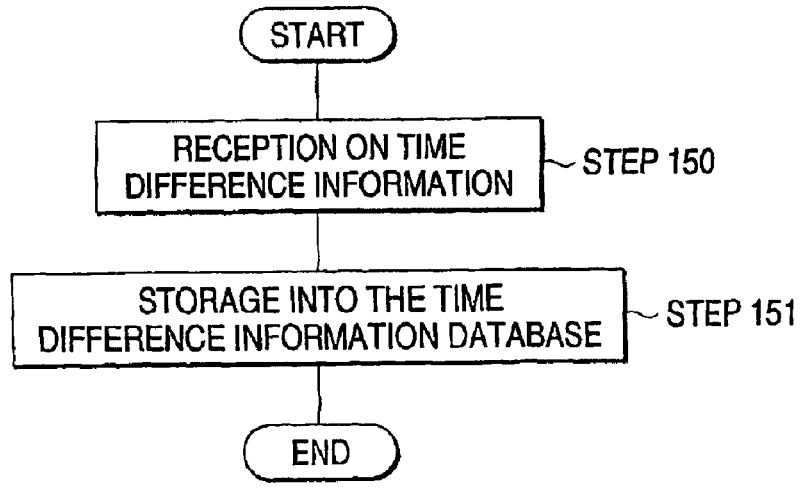
FIG. 9 is a flowchart showing storage of received time difference information into the time difference information database.
Figure 10:
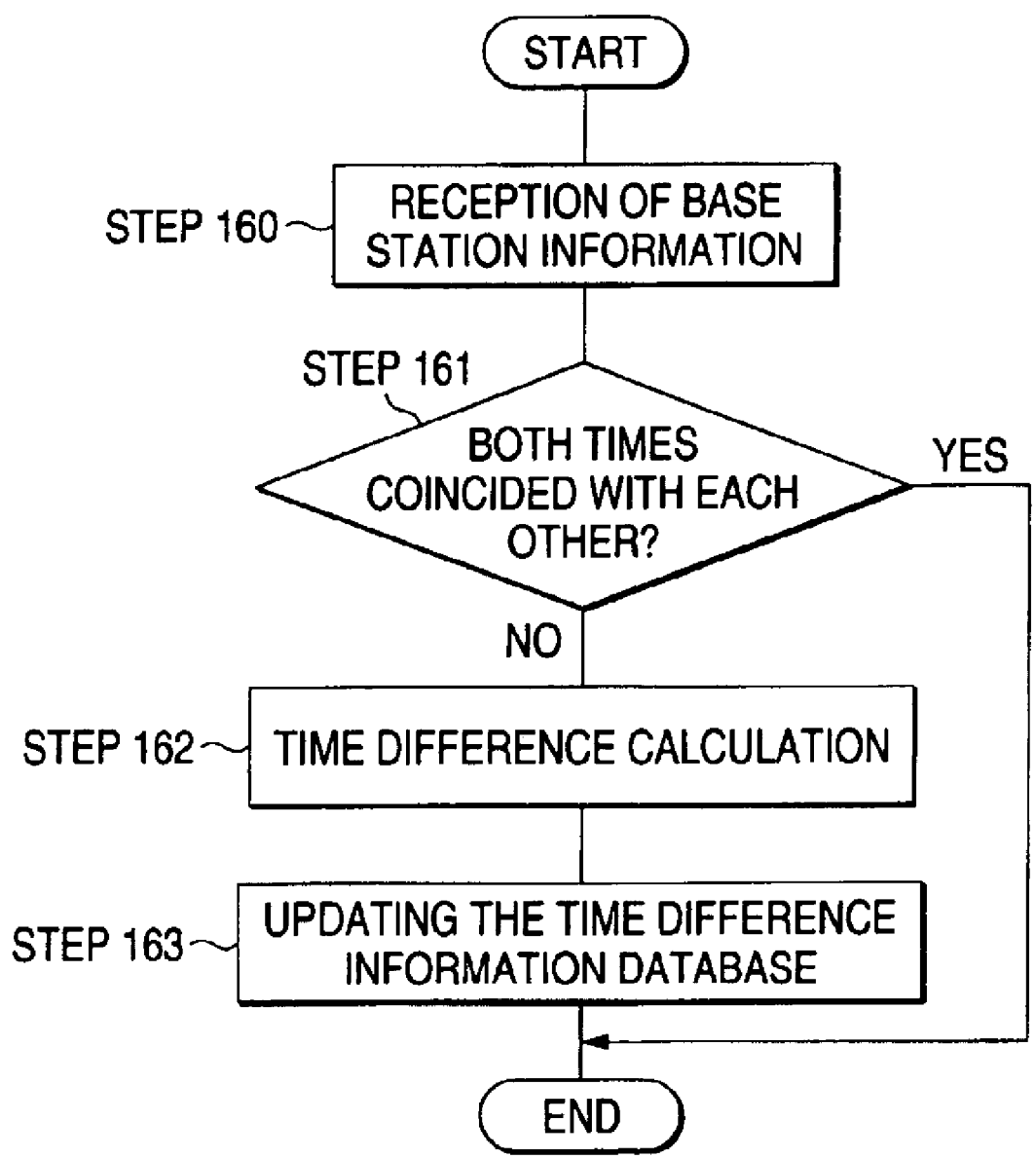
FIG. 10 is a flowchart showing update of the time difference information database using the base station information.
Figure 11:
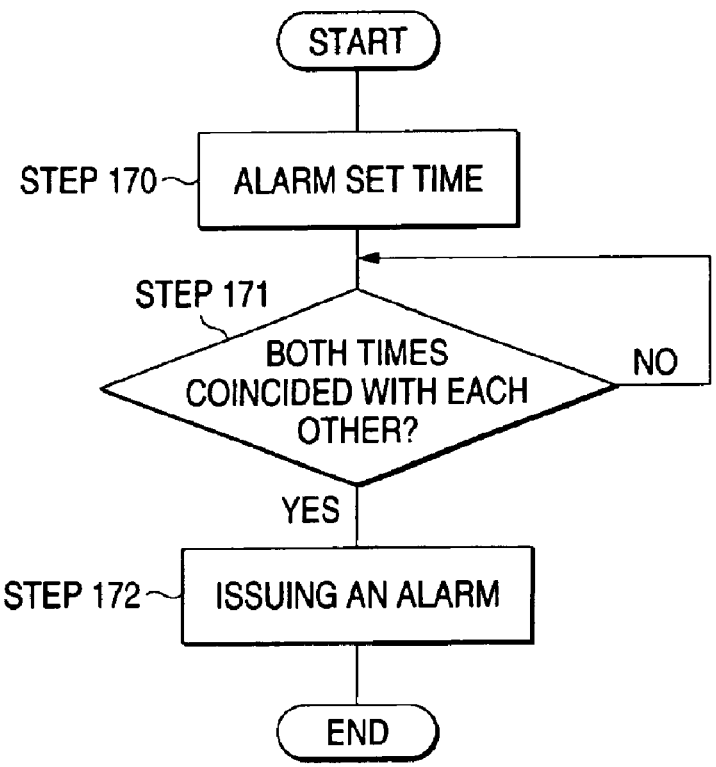
FIG. 11 is a flowchart showing issuing of an alarm.
Figure 12:
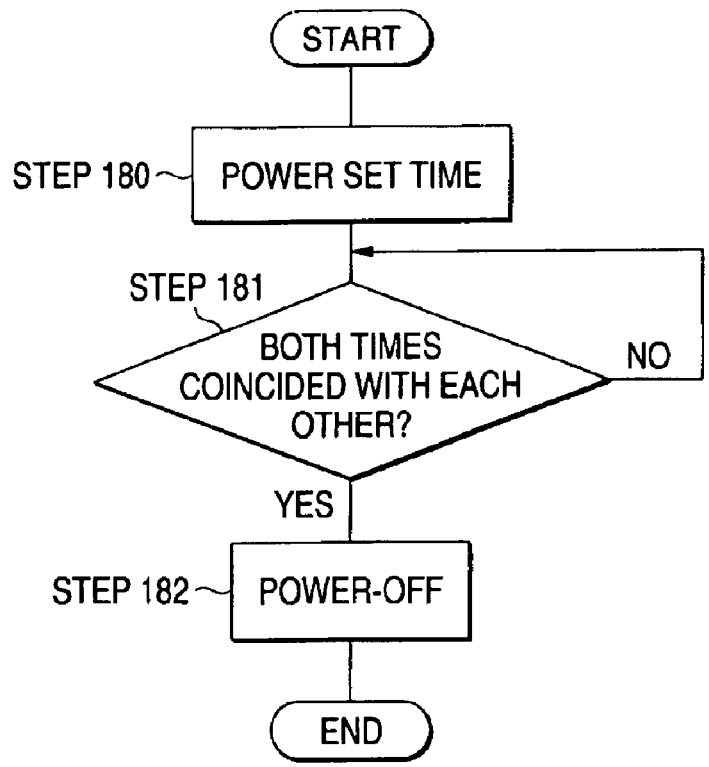
FIG. 12 is a flowchart showing the power-off control.
Figure 13:
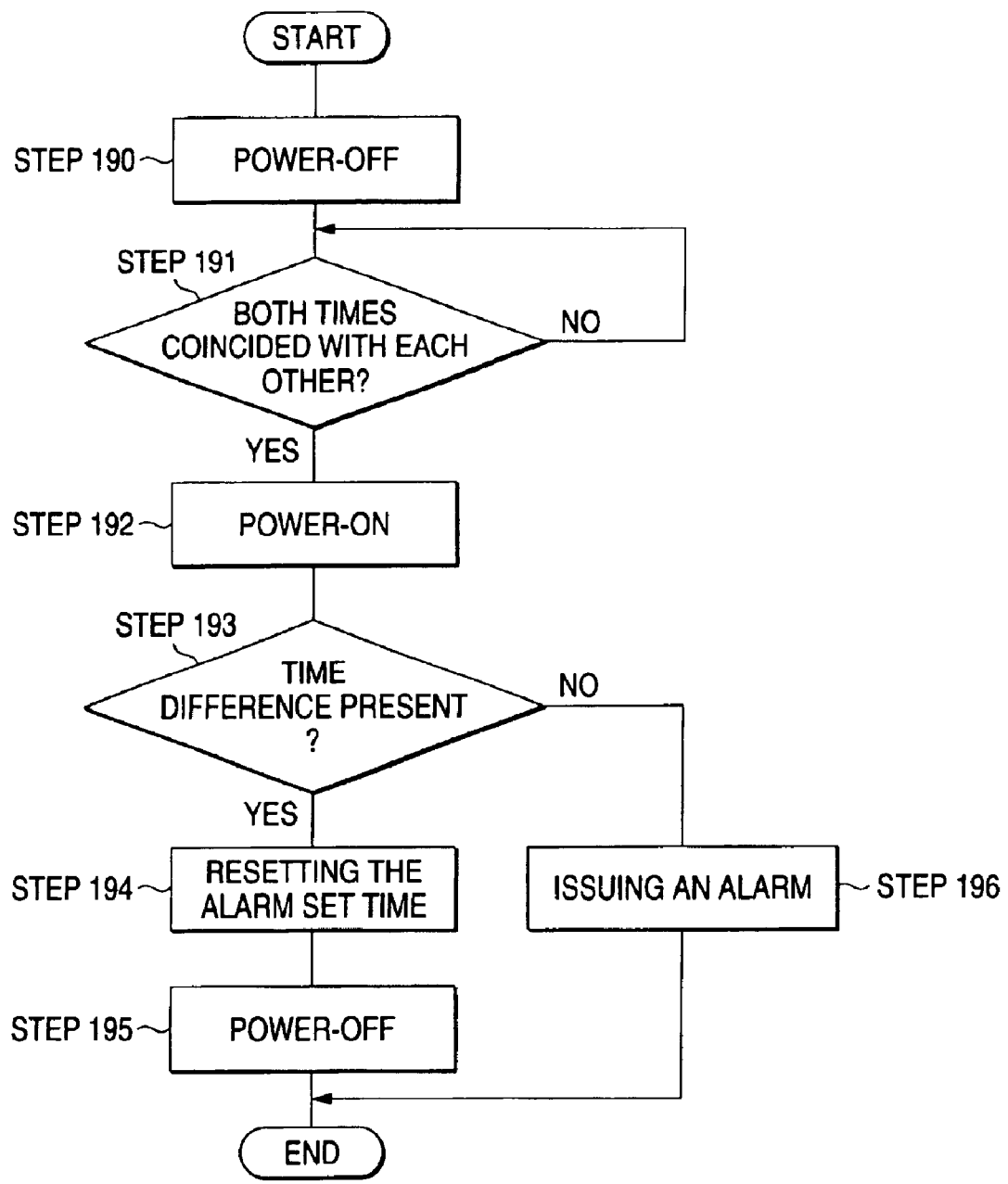
FIG. 13 is a flowchart showing resetting of the power-off alarm set time.
Figure 14:
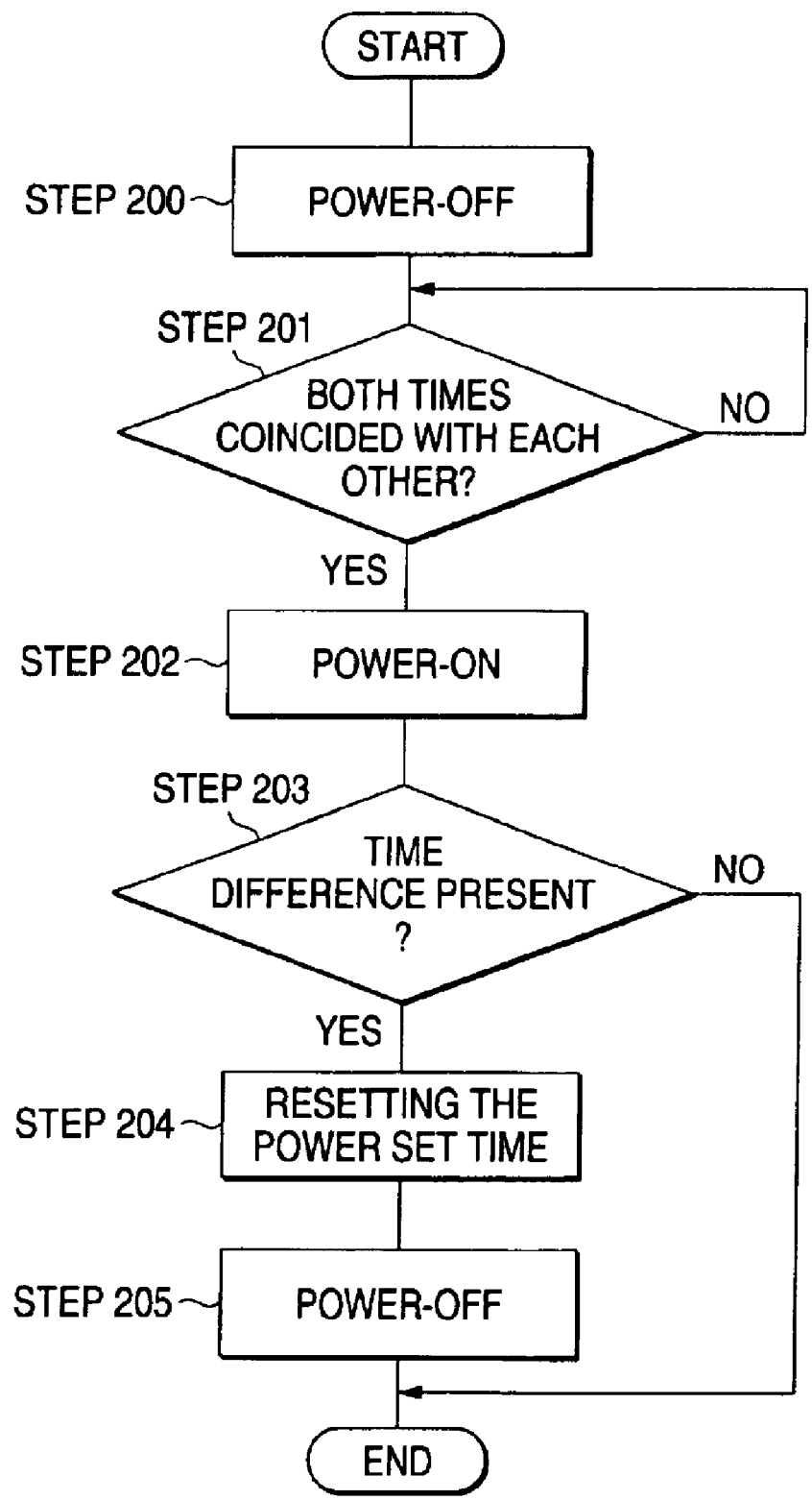
FIG. 14 is a flowchart showing resetting of the power-off power set time.

FIG. 4 is a flowchart showing the basic operation of time calculation in the controller, FIG. 5 a flowchart showing the time calculation made in case the area location is specified, FIG. 6 a flowchart showing storage of time difference information into the manual time difference information table and time calculation, FIG. 7 a flowchart showing storage of received reference area information into the reference area table, FIG. 8 a flowchart showing storage of reference area information into the reference area table, FIG. 9 a flowchart showing storage of received time difference information into the time difference information database, FIG. 10 a flowchart showing update of the time difference information database using the base station information, FIG. 11 a flowchart showing issuing of an alarm, FIG. 12 a flowchart showing the power-off control, FIG. 13 a flowchart showing resetting of the power-off alarm set time, and FIG. 14 a flowchart showing resetting of the power-off power set time.

(1) Basic Operation of Time Calculation in the Controller

As shown in FIG. 4, the time calculation mode of the time controller 24 is set to the automatic mode by the operation input section 16. The time calculation mode set here is stored in the mode setting table 32 (step 100).

In the automatic mode, information on the area location of the portable terminal apparatus 10 is received by the receiver 12, the area location is identified by the area location identification section 14, and the identification result is output to the time controller 24.

When a change in the area location of the portable terminal apparatus 10 that has moved is detected by the time controller 24 is detected, the time difference of the area location after movement from the Greenwich Mean Time is obtained from the time difference information database 34. Then, the time difference of the reference area location from the Greenwich Mean Time is obtained via the time difference information database 34 based on the reference area location information stored in the reference area table 36.

Next, the time difference of the area location after movement is subtracted from the time difference of the reference area location to obtain the time difference of the area location after movement from the reference area location (relative time difference from the reference area location) (step 101).

For example, assuming that the reference area location is Area A (time difference: +1[hour]) and the area location after movement is Area C (time difference: +3[hours]), the relative time difference from the reference area location is 3−1=+2[hours].

The reference time is added to the obtained relative time difference to calculate the time of the area location after movement. For example, assuming that the reference time is 8:30 a.m. in this case, the relative time difference from the reference area location is +2[hours] so that the time of the area location after movement is 10:30 a.m. (step 102).

Next, in case the fine adjustment time is set in the fine adjustment table 52, the fine adjustment time is added/subtracted to/from the calculated time (step 103). In case summer time information is set to the area location after movement in the summer time adjustment table 54, adjustment is made to advance the time by one hour (step 104). In case day, month, and/or year of the time thus calculated and adjusted is changed via steps 102 through 104, adjustment is made to set the time to correct day, month, and/or year (step 105).

The time calculated and adjusted by the time controller 24 is displayed on the display section 26 according to the display mode set in the display setting table 40 (step 106).

In case the portable terminal apparatus 10 has moved to cause a change in the area location of the portable terminal apparatus 10 thus generating a time difference, it is possible to automatically calculate and adjust the time according to the generated time difference so that the user need not manually set the time.

(2) Time Calculation Made in Case the Area Location is Specified

As shown in FIG. 5, an arbitrary area location is specified via the operation input section 16 (step 110). The time calculation mode is assumed to be the automatic mode.

Then, the time difference of the specified area location from the Greenwich Mean Time is obtained from the time difference information database. Next, the time difference of the reference area location from the Greenwich Mean Time is obtained via the time difference information database 34 based on the reference area location information stored in the reference area table 36.

The time difference of the specified area location is subtracted from the time difference of the reference area location to obtain the time difference of the specified area location from the reference area location (relative time difference from the reference area location). For example, assuming that the reference area location is Area A (time difference: +1[hour]) and the specified area location is Area Z (time difference: −1[hour]), the relative time difference from the reference area location is −1−1=−2[hours] (step 111).

The reference time is added to the obtained relative time difference to calculate the time of the specified area location. For example, assuming that the reference time is 8:30 a.m. in this case, the time of the area location after movement is 6:30 a.m. (step 112).

Next, in case the fine adjustment time is set in the fine adjustment table 52, the fine adjustment time is added/subtracted to/from the calculated time (step 113). In case summer time information is set to the area location entered in the summer time adjustment table 54, adjustment is made to advance the time by one hour (step 114).

In case day, month, and/or year of the time thus calculated and adjusted is changed via steps 112 through 114, adjustment is made to set the time to correct day, month, and/or year (step 115).

The time calculated and adjusted by the time controller 24 is displayed on the display section 26 according to the display mode set in the display setting table 40 (step 116).

In this way, it is possible to correctly calculate and display the time of a specified area location.

The display mode on the display section 26 used in case an area location is specified may be as shown in FIGS. 3A and B where only the time of the specified area location is displayed, or maybe as shown in FIGS. 3C and D where the time of the specified area location is displayed together with another time.

Another time may be the time of the area location after movement automatically calculated by the method under (1). Displaying the time calculated via the method under (1) together with the time of the specified area location allows the time of the area location of the portable terminal apparatus 10 as well as the time of the specified area location to be checked simultaneously.

A plurality of area locations can be specified and the time of each area location can be calculated. Further, when the plurality of area locations are specified, the times of the plurality of specified area locations may be displayed on the display section 26.

While the calculation operation mode is the automatic mode in this flowchart, the time of the area location after movement is not calculated via the method under (1) in the manual mode, so that only the time of the specified area location is calculated and displayed. In case a plurality of area locations are specified in the manual mode, the times of the plurality of specified area locations may be displayed.

While the time difference information database 34 is used to calculate the time of the specified area location, the time of an arbitrary area location may be calculated without using the time difference information database 34, for example by directly specifying a time difference from the reference time (for example −2[hours]).

(3) Storage of Time Difference Information into the Manual Time Difference Information Table and Time Calculation AS shown in FIG. 6, time difference information by area location is set via the operation input section 16 (step 120).

The time difference information by area location thus set is stored into the manual time difference information table 38 (step 121). This is the end of the procedure for storing the time difference information into the manual time difference information table 38. The time difference information can be arbitrarily set by the user.

Then, the time calculation mode is set to the manual mode (step 122).

Next, an arbitrary area location is specified via the operation input section 16 (step 123).

Then, the time difference of the specified area location from the Greenwich Mean Time is obtained from the manual time difference information table 38. Next, the time difference of the reference area location from the Greenwich Mean Time is obtained via the manual time difference information table 38 based on the reference area location information stored in the reference area table 36.

Next, the time difference of the specified area location is subtracted from the time difference of the reference area location to obtain the time difference of the specified area location from the reference area location (relative time difference from the reference area location) (step 124).

The reference time is added to the obtained relative time difference to calculate the time of the specified area location (step 125).

Next, in case the fine adjustment time is set in the fine adjustment table 52, the fine adjustment time is added/subtracted to/from the calculated time (step 126). In case summer time information is set to the area location entered in the summer time adjustment table 54, adjustment is made to advance the time by one hour (step 127).

In case day, month, and/or year of the time thus calculated and adjusted is changed via steps 125 through 127, adjustment is made to set the time to correct day, month, and/or year (step 128).

The time calculated and adjusted by the time controller 24 is displayed on the display section 26 according to the display mode set in the display setting table 40 (step 129).

Thus, it is possible to calculate and display the time of an arbitrary area location based on the time difference information stored in the manual time difference information table 38.

A plurality of area locations can be specified and the time of each area location can be calculated. Further, when the plurality of area locations are specified, the times of the plurality of specified area locations may be displayed on the display section 26.

While the manual time difference information table 38 is used to calculate the time of the specified area location, the time of an arbitrary area location maybe calculated without using the manual time difference information table 38, for example by directly specifying a time difference from the reference time (for example −2[hours]).

(4) Storage of Received Reference Area Information into the Reference Area Table As shown in FIG. 7, when the receiver 12 receives information on the reference area location (step 130), the time controller 24 stores the received reference area location information into the reference area table 36 (step 131).

Thus, it is possible to modify the reference area of the portable terminal apparatus 10 based on the received reference area location information.

In case reference area information is recorded on the IC card in advance, reference area information of the IC card may be read via the IC card section 20 and may be stored into the reference area table 36.

Reference area information may be received via a data port section 22 from equipment other than the portable terminal apparatus 10 and may be stored into the reference area table 36.

(5) Storage of Reference Area Information into the Reference Area Table

As shown in FIG. 8, when information on an arbitrary reference area location is set via the operation input section 16 (step 140), the time controller 24 stores the reference area location information thus set into the reference area table 36 (step 141).

Thus, it is possible to arbitrarily set the reference area of the portable terminal apparatus 10. As a result, it is possible to set the reference area of the portable terminal apparatus 10 by area used. For example, in case the portable terminal apparatus 10 conforms to the Japanese Specifications, information on the reference area location is a location code indicating the area location of Japan. In case the portable terminal apparatus 10 conforms to the U.K. Specifications or is modified to conform to the U.K. Specifications, information on the reference area location is a location code indicating the area location of the U.K.

(6) Storage of Received Time Difference Information into the Time Difference Information Database As shown in FIG. 9, when the receiver 12 receives time difference information (step 150), the time controller 24 stores the received time difference information into the time difference information database 34 (step 151).

Thus, it is possible to modify the difference information database 34 based on the received time difference information.

In case time difference information is recorded on the IC card in advance, time difference information of the IC card may be read via the IC card section 20 and may be stored into the time difference information database 34.

Time difference information may be received via a data port section 22 from equipment other than the portable terminal apparatus 10 and may be stored into the time difference information database 34.

(7) Update of the Time Difference Information Database Using the Base Station Information As shown in FIG. 10, the receiver 12 receives area location information and the time concerning the base station (step 160). Received area location information is a location code indicating the area location of the base station. Received time is a time of the area location of the base station.

The time controller 24 calculates the time of the received area location based on the received area location information (see the automatic mode under (1)), then compares the calculated time with the received time (step 161).

In case both times do not coincide with each other, the time controller 24 calculates the time difference of the calculated time from the received time (step 162), and updates the time difference information by area in the time difference information database 34 by the time difference calculated in step 162, so that the calculated time may coincide with the received time (step 163).

Updating of the time difference information database 34 will be explained referring to a specific example. Assuming that the calculated time is 8:30 a.m. and the received time is 9:00 a.m., time difference of the calculated time from the received time is +30 minutes. Thus, the time difference of +30 minutes is added to the time difference information in the time difference information database 34 to update the time difference information. Time difference information to be updated may be all the time difference information stored in the time difference information database 34 or only the time difference information on the received area location.

Therefore, by receiving area location information and time information, it is possible to update the time difference information database 34.

(8) Issuing an Alarm

As shown in FIG. 11, when an alarm set time is set via the operation input section 16, the alarm set time is stored into the alarm setting table 62 (step 170). The time controller 24 compares the calculated time with the alarm set time (step 171) and in case both times coincide with each other, controls the alarm section 28 to issue an alarm (step 172).

It is thus possible to store a predetermined alarm set time into the alarm setting table 62 and issue an alarm when the calculated time reaches the alarm set time.

In case a plurality of times are calculated by the time controller 24 and displayed on the display section, the alarm issuing operation is made at the time specified via the operation input section 16.

(9) Power-Off Control

As shown in FIG. 12, when a power set time is set via the operation input section 16, the power set time is stored into the power-off setting table 66 (step 180). The time controller 24 compares the calculated time with the power set time (step 181) and in case both times coincide with each other, controls the power supply 19 to turn off power to a preset unit (step 182).

It is thus possible to store a predetermined power set time into the power-off setting table 66 and turn off power when the calculated time reaches the power set time.

In case a plurality of times are calculated by the time controller 24 and displayed on the display section, the power-off operation is made at the time specified via the operation input section 16.

(10) Resetting the Alarm Set Time at Power-Off

As shown in FIG. 13, power to a preset unit is turned off (step 190). Power is fed to at least the timekeeping section 18. The alarm set time at power-off is set and maintained in the alarm setting table at power-off 63 of the timekeeping section 18. The time calculation mode is the automatic mode.

Next, the timekeeping section 18 compares the reference time with the alarm set time at power-off (step 191). In case the reference time coincides with the alarm set time at power-off, the timekeeping section 18 controls the power supply 19 to turn on power to a unit to which power is turned off (step 192).

When the power is turned on, the automatic mode shown under (1) is selected. Information on the time difference of the area location assumed when power is turned on this time from the area location just before the power is turned off is obtained from the time difference information database 34 and whether time difference is present or not is determined (step 193).

In case the time difference is present, the obtained time difference information is added/subtracted to/from the power-off alarm set time to reset the power-off alarm set time (step 194).

The timekeeping section 18 controls the power supply 19 to turn off power to a preset unit (step 195).

In case time difference is absent in step 193, an alarm is issued via the alarm section 28 (step 196).

Even when the portable terminal apparatus 10 has moved to an area having time difference with the power turned off, update is made by the time difference that has caused the alarm set time at power-off. Thus it is possible to update the alarm set time at power-off in accordance with the time difference.

In case a plurality of times are calculated by the time controller 24 and displayed on the display section, the alarm issuing operation is made at the time specified via the operation input section 16.

(11) Resetting the Power Set Time at Power-Off

As shown in FIG. 14, power to a preset unit is turned off (step 200). Power is fed to at least the timekeeping section 18. The power set time at power-off is set and maintained in the power setting table at power-off 65 of the timekeeping section 18. The time calculation mode is the automatic mode.

Next, the timekeeping section 18 compares the reference time with the power set time at power-off (step 201). In case the reference time coincides with the -off power set time at power-off, the timekeeping section 18 controls the power supply 19 to turn on power to a unit to which power is turned off (step 202).

When the power is turned on, the automatic mode shown under (1) is selected. Information on the time difference of the area location assumed when power is turned on this time from the area location just before the power is turned off is obtained from the time difference information database 34 and whether time difference is present or not is determined (step 203).

In case the time difference is present, the obtained time difference information is added/subtracted to/from the power-off power set time to reset the power-off power set time (step 204).

The timekeeping section 18 controls the power supply 19 to turn off power to a preset unit (step 205).

Even when the portable terminal apparatus 10 has moved to an area having time difference with the power turned off, update is made by the time difference that has caused the power set time at power-off. Thus it is possible to update the power set time at power-off in accordance with the time difference.

In case a plurality of times are calculated by the time controller 24 and displayed on the display section, the power-off operation is made at the time specified via the operation input section 16.

INDUSTRIAL APPLICABILITY

According to the portable terminal apparatus of the invention, by receiving the area location information of the portable terminal apparatus even when the portable terminal apparatus has moved and obtaining the time difference information of the received area location from the time difference information database, it is possible to automatically calculate the time corresponding to the area of the portable terminal apparatus and display the calculated time via the display section.

Correct time is displayed without the user having to enter or register time difference information.

What is claimed is:

1. A portable terminal apparatus having a feature for keeping and displaying time, comprising:
    a receiver which receives area location information indicating the location of the portable terminal apparatus;
    an area identification section which identifies the area information of the portable terminal apparatus based on the output from the receiver;
    a time difference information database which stores information on a time difference from the Greenwich Mean Time by a plurality of area locations;
    a reference area table which stores reference area location information as the area location information of a reference location of the portable terminal apparatus, said area location information comprising a member of a code set that is defined as a universal standard for indicating location;
    a timekeeping section which keeps and outputs the reference time that is the time in the reference area;
    a time controller which obtains time difference information on an area location after movement from the reference area location from the time difference information database, adding/subtracting the obtained time difference information to/from the reference time of the timekeeping section, and automatically calculating the time corresponding to the area location after movement, when the area location of the portable terminal apparatus has changed with the movement of the portable terminal apparatus from the identification result of the area location by the reference area location identification section, thus causing a time difference between the area locations before and after movement; and
    a display section which displays the time automatically calculated by the time controller.

2. A portable terminal apparatus according to claim 1, wherein the display section displays either the reference time or the time corresponding to the area location after movement, or a combination of these times.

3. A portable terminal apparatus according to claim 2, further comprising:
    a mode input section which selectively enters a time difference calculation mode on whether to automatically calculate the time corresponding to the area location after movement or not to the time controller; and
    a mode setting table which stores the time difference calculation mode entered via the mode input section,
    wherein the time controller calculates the time corresponding to the area location after movement and the display section displays the time corresponding to the area location after movement, in case the time difference calculation mode is selected to automatically calculate the time corresponding to the area location after movement,
    wherein the time controller calculates the time corresponding to the specified area location and the display section displays the time corresponding to the specified area location, in case the time difference calculation mode is selected not to calculate the time corresponding to the area location after movement.

4. A portable terminal apparatus according to claim 2, further comprising:
    a time specification section for specifying an arbitrary time from among a plurality of times in case the plurality of times are displayed on the display section,
    an alarm section which notifies coincidence of a time specified by the time specification section with a preset alarm set time.

5. A portable terminal apparatus according to claim 2, further comprising a time specification section which specifies an arbitrary time from among a plurality of times in case the plurality of times are displayed on the display section,
    wherein the time controller which turns off the power to a preset unit in the portable terminal apparatus when a time specified by the time specification section coincides with a preset power set time.

6. A portable terminal apparatus according to claim 2, further comprising:
    a time specification section which specifies an arbitrary time from among a plurality of times in case the plurality of times are displayed on the display section; and
    an alarm time setting section for setting an alarm set time as a time to issue an alarm for a time specified by the time specification section,
    wherein the timekeeping section turns on or off the power to the preset unit in the portable terminal apparatus,
    wherein the timekeeping section sets and maintains an alarm set time at power-off obtained by adding/subtracting the time difference of the reference time from the time specified by the time specification section to/from the alarm set time,
    wherein the timekeeping section turns on the power to a preset unit in the portable terminal apparatus in case the reference time coincides with the alarm set time at power-off in the timekeeping section while the power to a preset unit in the portable terminal apparatus is turned off, wherein the time controller calculates information on the time difference of the area location assumed when power is turned on this time from the area location just before the power is turned off from the time difference information database, wherein the timekeeping section adds/subtracts the calculated time difference information to/from the alarm set time at power-off and resets and maintains the alarm set time at power-off and further turns off the power to a preset unit in the portable terminal apparatus.

7. A portable terminal apparatus according to claim 2, further comprising:

a time specification section which specifies an arbitrary time from among a plurality of times in case the plurality of times are displayed on the display section; and a power-on time setting section which sets the power set time to turn on the power to a preset unit in the portable terminal apparatus for a time specified by the time specification section, wherein the timekeeping section which turns on or off the power to the preset unit in the portable terminal apparatus, wherein the timekeeping section sets and maintains a power set time at power-off obtained by adding/subtracting the time difference of the reference time from the time specified by the time specification section to/from the power set time, wherein the timekeeping section turns on the power to the preset unit in the portable terminal apparatus in case the reference time coincides with the power set time at power-off in the timekeeping section while the power to the preset unit in the portable terminal apparatus is turned off, wherein the time controller calculates information on the time difference of the area location assumed when power is turned on this time from the area location just before the power is turned off from the time difference information database, wherein the timekeeping section adds/subtracts the calculated time difference information to/from the power set time and resets and maintains the power-off power set time and further turns off the power to the preset unit in the portable terminal apparatus.

8. A portable terminal apparatus according to claim 1, further comprising an area specification section that can specify one or more arbitrary area locations, wherein, in case that an arbitrary area location is specified in the area specification section, the time controller obtains information on the time difference of the specified area location from the reference area location from the time difference information database and adds/subtracts the obtained time difference information to/from the reference time of the timekeeping section, and the display section displays at least the time corresponding to the specified area location.

9. A portable terminal apparatus according to claim 8, wherein the display section displays either the reference time, the time corresponding to the area location after movement or the time corresponding to the specified area location, or a combination of these times.

10. A portable terminal apparatus according to claim 8, further comprising:

a mode input section which selectively enters a time difference calculation mode on whether to automatically calculate the time corresponding to the area location after movement or not to the time controller; and a mode setting table which stores the time difference calculation mode entered via the mode input section, wherein the time controller calculates the time corresponding to the area location after movement and the display section displays the time corresponding to the area location after movement, in case the time difference calculation mode is selected to automatically calculate the time corresponding to the area location after movement, wherein the time controller calculates the time corresponding to the specified area location and the display section displays the time corresponding to the specified area location, in case the time difference calculation mode is selected not to calculate the time corresponding to the area location after movement.

11. A portable terminal apparatus according to claim 10, further comprising:

a time difference information input section which enters information on time difference from the reference area by the plurality of area locations; and a manual time difference information table which stores information on time difference from the reference area entered via the time difference information input section by the plurality of area locations, wherein the arbitrary area location is specified via the area specification section, wherein the time controller obtains information on the time difference of the specified location from the reference area location from the manual time difference information table and adds/subtracts the obtained time difference information to/from the reference time of the timekeeping section to calculate the time corresponding to the specified area location, wherein the display section displays at least the time corresponding to the specified area location.

12. A portable terminal apparatus according to claim 1, further comprising an alarm section which notifies coincidence of a single time with a preset alarm set time in case the single time is displayed on the display section.

13. A portable terminal apparatus according claim 1, wherein the time controller which turns off the power to a preset unit in the portable terminal apparatus when a single time coincides with a preset power set time in case the single time is displayed on the display section.

14. A portable terminal apparatus according to claim 1, further comprising an alarm time setting section which sets an alarm set time as a time to issue an alarm for a single time in case the single time is displayed on the display section, wherein the timekeeping section turns on or off the power to the preset unit in the portable terminal apparatus, wherein the timekeeping section sets and maintains an alarm set time at power-off obtained by adding/subtracting the time difference of the reference time from the single time to/from the alarm set time, wherein the timekeeping section turns on the power to a preset unit in the portable terminal apparatus in case the reference time coincides with the alarm set time at power-off in the timekeeping section while the power to a preset unit in the portable terminal apparatus is turned off, wherein the time controller calculates information on the time difference of the area location assumed when power is turned on this time from the area location just before the power is turned off from the time difference information database, wherein the timekeeping section adds/subtracts the calculated time difference information to/from the alarm set time and resets and maintains the power-off alarm set time and further turns off the power to a preset unit in the portable terminal apparatus.

15. A portable terminal apparatus according to claim 1, further comprising:

a power-on time setting section which sets the power set time to turn on the power to a preset unit in the portable terminal apparatus for a single time in case the single time is displayed on the display section, wherein the timekeeping section turns on or off the power to the preset unit in the portable terminal apparatus, wherein the timekeeping section sets and maintains a power set time at power-off obtained by adding/subtracting the time difference of the reference time from the single time to/from the alarm set time, wherein the timekeeping section turns on the power to the preset unit in the portable terminal apparatus in case the reference time coincides with the power-off alarm set time in the timekeeping section while the power to a preset unit in the portable terminal apparatus is turned off, wherein the time controller calculates information on the time difference of the area location assumed when power is turned on this time from the area location lust before the power is turned off from the time difference information database, wherein the timekeeping section adds/subtracts the calculated time difference information to/from the power set time at power-off and resets and maintains the power set time at power-off and further turns off the power to a preset unit in the portable terminal apparatus.

16. A portable terminal apparatus according to claim 1, wherein the preset unit in the portable terminal apparatus does not include at least the timekeeping section.

17. A portable terminal apparatus according to claim 1, further comprising a reference area receiver which receives the reference area location information stored in the reference area table, wherein the time controller updates the reference area location information in the reference area table based on the reference area location information received by the reference area receiver.

18. A portable terminal apparatus according to claim 1, further comprising a reference area specification section which specifies the area location of the reference area stored in the reference area table to an arbitrary area location.

19. A portable terminal apparatus according to claim 1, further comprising a time difference information receiver which receives the time difference information stored in the time difference information database, the time controller updates the reference area location information in the time difference information database based on the time difference information received by the time difference information receiver.

20. A portable terminal apparatus according to claim 1, further comprising a base station information receiver which receives area location information and time concerning a base station sent from the base station, wherein the time controller compares the time of the base station received by the base station information receiver with the calculated base station time as a time calculated in correspondence with the area location information on the base station, obtains the time difference of the calculated base station time from the base station time in case the both times do not coincide with each other, and adds/subtracts the time difference to/from the time difference information in the time difference information database so that the calculated base station time may coincide with the base station time, thereby updating the time difference information.

21. A portable terminal apparatus according to claim 1, further comprising a fine adjustment table which stores minute information in a rewritable way, wherein the time controller adjusts the time based on the fine adjustment information to calculate the time.

22. A portable terminal apparatus according to claim 1, further comprising a summer time adjustment table for storing summer time information in a rewritable way, wherein the time controller adjusts the time based on the summer time information to calculate the time.

23. A portable terminal apparatus according to claim 1, wherein the time controller adjusts day, month, and/or year in case day, month, and/or year is changed in the time on the display section before displaying the time on the display section.

* * * * *

UNITED STATES PATENT AND TRADEMARK OFFICE
CERTIFICATE OF CORRECTION

PATENT NO. : 6,876,600 B2
DATED : April 5, 2005
INVENTOR(S) : Ito et al.

It is certified that error appears in the above-identified patent and that said Letters Patent is hereby corrected as shown below:

Column 25,
Line 32, please delete "lust" and insert therfor -- just --.

Signed and Sealed this

Fifth Day of July, 2005

JON W. DUDAS
*Director of the United States Patent and Trademark Office*